(12) United States Patent
Korhonen et al.

(10) Patent No.: US 9,912,585 B2
(45) Date of Patent: Mar. 6, 2018

(54) MANAGING PATH SELECTION AND RESERVATION FOR TIME SENSITIVE NETWORKS

(71) Applicant: Avago Technologies General IP (Singapore) Pte. Ltd., Singapore (SG)

(72) Inventors: Jouni Korhonen, Mountain View, CA (US); Philippe Klein, Jerusalem (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 127 days.

(21) Appl. No.: 14/743,373

(22) Filed: Jun. 18, 2015

(65) Prior Publication Data

US 2015/0372907 A1 Dec. 24, 2015

Related U.S. Application Data

(60) Provisional application No. 62/016,574, filed on Jun. 24, 2014.

(51) Int. Cl.
| | |
|---|---|
| *H04L 12/721* | (2013.01) |
| *H04L 12/751* | (2013.01) |
| *H04L 12/841* | (2013.01) |
| *H04L 12/803* | (2013.01) |
| *H04L 12/725* | (2013.01) |

(52) U.S. Cl.
CPC ............. *H04L 45/66* (2013.01); *H04L 45/02* (2013.01); *H04L 45/302* (2013.01); *H04L 47/125* (2013.01); *H04L 47/28* (2013.01)

(58) Field of Classification Search
CPC ...................................................... H04L 45/66
See application file for complete search history.

(56) References Cited

U.S. PATENT DOCUMENTS

| | | | |
|---|---|---|---|
| 7,164,658 B1 * | 1/2007 | Shenoy | H04L 12/4633 370/254 |
| 9,444,721 B2 * | 9/2016 | Zhang | H04L 45/12 |
| 2005/0213558 A1 * | 9/2005 | Levit | H04L 12/42 370/351 |
| 2006/0010249 A1 * | 1/2006 | Sabesan | H04L 45/02 709/238 |
| 2013/0336159 A1 * | 12/2013 | Previdi | H04L 45/50 370/254 |
| 2014/0112171 A1 * | 4/2014 | Pasdar | H04L 45/70 370/252 |

* cited by examiner

*Primary Examiner* — Jason Mattis
(74) *Attorney, Agent, or Firm* — Foley & Lardner LLP (57) ABSTRACT

In some aspects, the disclosure is directed to methods and systems for management of path selection and reservation between layer 3 devices, as well as path selection and reservation across L2/L3 boundaries. In one implementation, path selection can be managed by separating independent but "cooperating" layers, with layer 3 topology and non-adjacent layer 2 topologies handled separately. A first layer 3 router can be identified as a path computation engine (PCE), while other layer 3 routers can be implemented as path control clients (PCC(s)). One layer 2 PCE can be assigned per layer 2 topology, preventing competing path assignments and reservations.

20 Claims, 7 Drawing Sheets

MANAGING PATH SELECTION AND RESERVATION FOR TIME SENSITIVE NETWORKS

CROSS-REFERENCE TO RELATED APPLICATIONS

This application claims the benefit of and priority to U.S. Provisional Application No. 62/016,574, entitled "MANAGING PATH SELECTION AND RESERVATION FOR TIME SENSITIVE NETWORKS," filed Jun. 24, 2014, which is incorporated by reference herein in its entirety.

FIELD OF THE DISCLOSURE

This disclosure generally relates to systems and methods for network management and path selection. In particular, this disclosure relates to systems and methods for managing path selection and reservation between Open Systems Interconnection model (OSI) layer 3 devices and across layer 2/3 boundaries.

BACKGROUND OF THE DISCLOSURE

In many implementations of networks, and particularly home networks, multiple routers can be connected in series or parallel, resulting in a plurality of network segments and potential paths between end point devices. This can cause issues with path selection and reservation between OSI layer 3 (network) devices such as layer 3 routers and switches, and across layer 2 (data link layer)/layer 3 boundaries, particularly with time sensitive networking (TSN) data under IEEE 802.1 standards, such as low-latency bidirectional multimedia data.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

The details of various embodiments of the methods and systems are set forth in the accompanying drawings and the description below.

DETAILED DESCRIPTION

Described herein is a system for managing path selection and reservation. The system includes a first device comprising a processor configured for executing a layer 2 path computation engine and a layer 3 path computation engine. In some implementations, the layer 2 path computation engine determines a layer 2 topology for a plurality of devices in communication with the first device, and provides, to the layer 3 path computation engine, an aggregated summary of the determined layer 2 topology and its switching capability. In some implementations, the layer 3 path computation engine receives, from a second device executing a layer 3 path computation client, a request for a layer 3 path between a layer 3 source and a layer 3 destination; computes a path between the layer 3 source and the layer 3 destination, based on the aggregated summary of the layer 2 topology; and provides, to the layer 3 path computation client of the second device, responsive to the request, the computed layer 3 path.

Figure 1A:
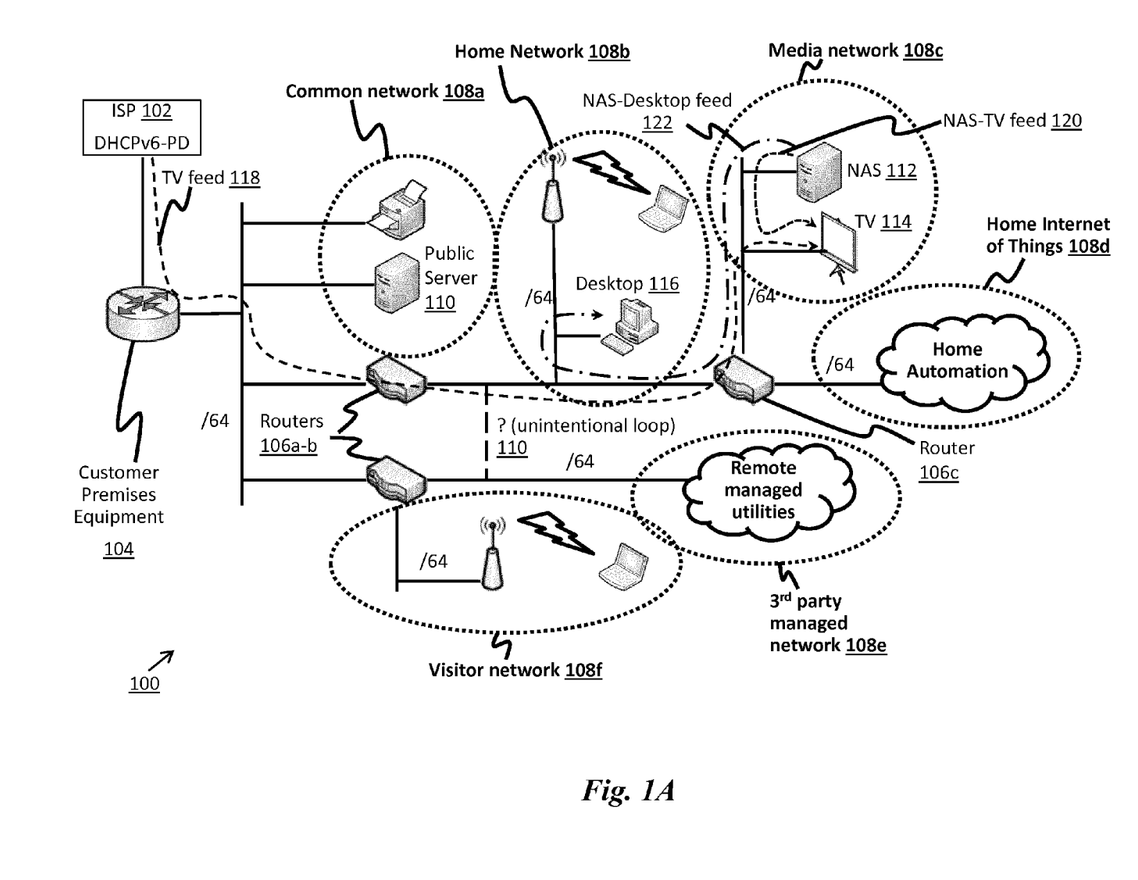
FIG. 1A is a diagram illustrating an example of a network, according to one implementation.

FIG. 1A is a diagram illustrating an example of a network 100, according to one implementation. As shown, the network 100 can include an internet service provider (ISP) 102, which can, in some implementations, provide a dynamic host configuration protocol for Internet Protocol version 6 (IPv6) (DHCPv6) with prefix delegation (PD). The ISP 102 can include a broadband service provider, satellite service provider, fiber service provider, or any other type and form of ISP. Although shown in IPv6, many implementations can use Internet Protocol version 4 (IPv4). The network can include customer premises equipment (CPE) 104, such as a cable modem, satellite modem, fiber modem, or other such network gateway.

In some implementations, the network after or beyond the CPE 104 from the ISP 102 can be referred to as an internal network. The internal network can be further subdivided as shown into a common network 108a, including devices with packet routing provided by the CPE 104; a home network 108b behind or with routing and network address translation provided by a first router 106a, and including desktop computers 116, laptop computers, tablet computers (not illustrated), wireless access points such as 802.11a, 802.11b, 802.11g, 802.11n, or 802.11ac access points, or any other type of wireless access point, or other such devices; a media network 108c including a network attached storage (NAS) device 112 and a smart television 114, behind a second router 106c, itself behind first router 106a; a home automation system or "Internet of Things", such as smart thermostats, smart refrigerators, smart immersion circulators, smart lighting, security systems, or other such systems, which can also be behind the second router 106c; a $3^{rd}$ party managed network 108e of remote managed utilities, such as electrical meters or other such devices, behind a third router 106b; and a visitor network 108f, which can include a wireless access point, also behind the third router 106b. Although only a few devices are shown, many additional devices can be provided on each network or subnetwork 108a-108f. Furthermore, other topologies can be readily implemented. As shown, in many implementations, the internal network can be divided into separate IPv6/64 subnets and/or IPv4 subnets. In some implementations, errors in topology can result in unintentional loops 110. Such loops can cause collisions and errors in path detection.

In some implementations, low latency multimedia data or TSN data, including voice over IP, video chat, streamed data, etc., can be transmitted over a network 100. For example, a television feed 118 can be transmitted as IP over the network to a smart or IP television 114, as shown in medium dashed line. Similarly, a multimedia stream can be transmitted from a NAS 112 to a television, such as NAS-TV feed 120, shown in small dashes; or can be transmitted from a NAS to a desktop, such as NAS-Desktop feed 122 shown in alternating dashes and dots. Accordingly, such streams can cross layer 2 networks such as home network 108b and media network 108c; or can cross layer 2/layer 3 network boundaries such as a stream from ISP 102 external to network 100 via CPE 104.

Accordingly, a question arises in such implementations how to manage path selection and reservation between layer 3 devices, as well as how to manage path selection and reservation across L2/L3 boundaries. In one implementation, path selection can be managed by separating independent but "cooperating" layers, with layer 3 topology and non-adjacent layer 2 topologies handled separately. A first layer 3 router can be identified as a path computation element or path computation engine (PCE), while other layer 3 routers can be implemented as path control clients (PCC(s)). One layer 2 PCE can be assigned per layer 2 topology, preventing competing path assignments and reservations.

Figure 1B:
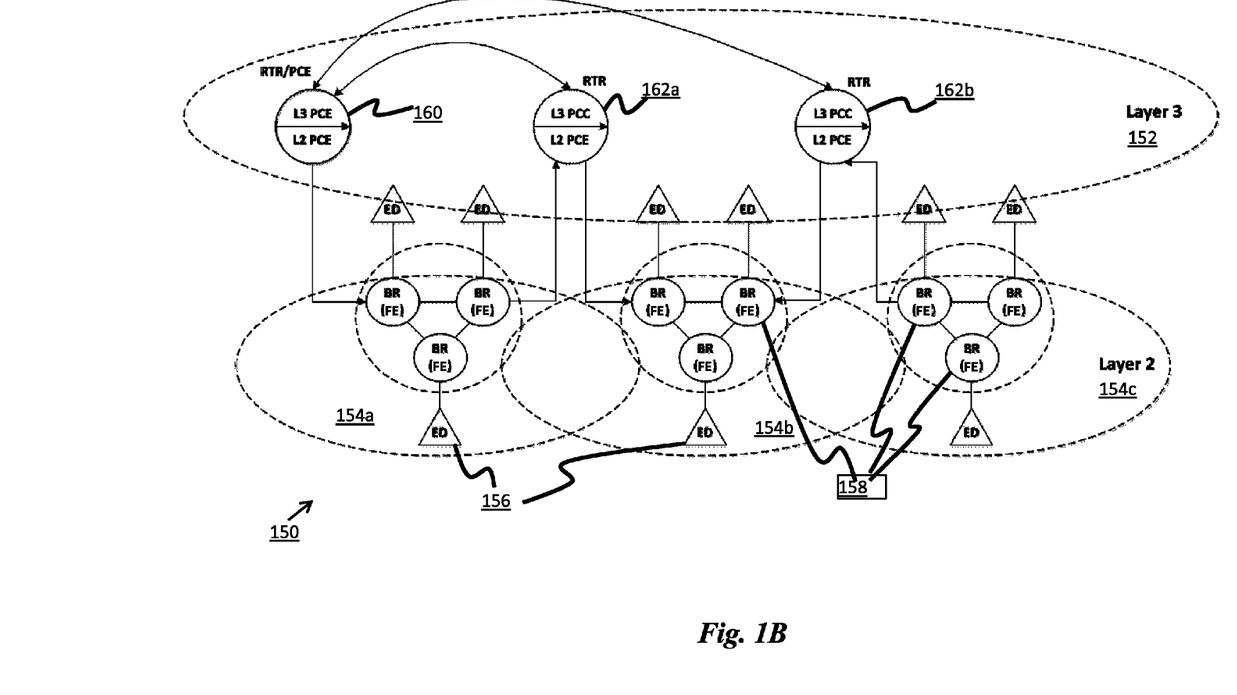
FIG. 1B is a diagram illustrating a network architecture for managing path selection and reservation, according to one implementation.

FIG. 1B is a diagram illustrating a network architecture for managing path selection and reservation, according to one implementation. As shown, a single layer 3 network 152 can include a plurality of layer 2 networks 154a-154c (generally, layer 2 network(s) 154). The layer 3 network 152 can include a plurality of routers 160, 162a-162b. A first router 160 can be assigned as a master PCE for the layer 3 topology, with routers 162a-162b assigned as slave PCCs. Each router 160, 162a-162b can further serve as a PCE for a corresponding layer 2 network topology, including forwarding elements (FE), also referred to as path engines (PE), such as bridges or routers (BR) 158, and end destinations (ED) 156, such as desktop or laptop computers, NAS or SAN devices, smart televisions, printers, third party network gateways, access points, etc. As shown, the master PCE 160 can transmit path calculation or reservations to slave PCCs, for example responsive to path requests from the PCCs.

Figure 2:
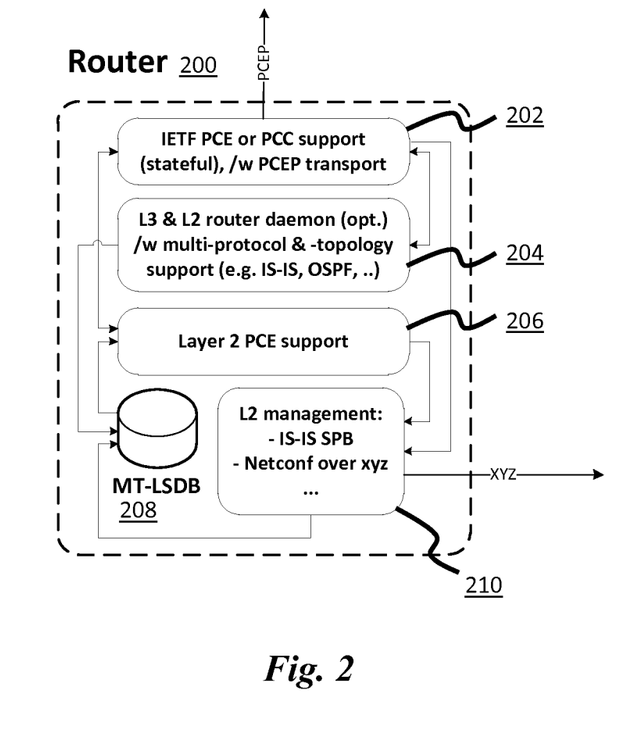
FIG. 2 is a block diagram of an embodiment of a router with L3 and L2 path computation engine capabilities.

FIG. 2 is a block diagram of an embodiment of a router 200 with L3 and L2 PCE capabilities. As shown, the router can include a stateful IETF-compliant PCE or PCC engine 202, utilizing a path computation element communication protocol (PCEP) transport 202. The router can further include an L3 and L2 router daemon 204, in some implementations, with multi-protocol and multi-topology support, including support for intermediate-system to intermediate-system (IS-IS) routing; open shortest path first (OSPF) routing; border gateway protocol (BGP) routing; fabric shortest path first (FSPF) routing; shortest path bridging (SPB) routing; or any other type and form of routing protocol. In some implementations, the router can include a layer 2 PCE support engine 206. The router daemon 204 and/or PCE support engine 206 can communicate with or maintain a multi-topology link state database MT-LSDB (208), in some implementations. In some implementations, the router 200 can further include a layer 2 management engine 210, handling IS-IS SPB, Netconf protocols, or any other such protocols.

PCEs for both layer 3 and layer 2 can have different topology views in some implementations. For example, in one such implementation, an L3 PCE can know L2 circuits or logical paths to the next L3 hop(s) and an L2 PCE can know its own network links/hops. Layer 2 PCEs can use any standard link-state protocol (e.g. IS-IS or equivalent) for path management. in some implementations, layer 2 circuits or logical paths can be computed based on Layer 3 path requests.

In some implementations, a path element (e.g. a switch or bridge, or other computing device 158), can not necessarily feature an IP stack, although a stack can be part of many FE devices. The FE devices 158 can, in some instances, allow remote management of routing tables or routing information base (RIB) and/or forwarding tables or forwarding information base (FIB) data. Static FIBs can be used, in some implementations. FE devices can be managed by a Layer 2 PCE, In some implementations, the FE devices do not have any access to Layer 3 routing information, and cannot perform any logical path computations; however, the FE devices can report their own capabilities and statuses to a layer 2 or layer 3 PCE.

The layer 2 PCE (e.g. router element 206) can be pre-configured with the layer 2 topology it manages, or can dynamically learn the topology via one or more routing discovery protocols. The layer 2 PCE can manage FE device quality of service (QoS) balancing and bandwidth management and reservations, and can be informed of any of the FE locally originated configurations, initial configurations, or other configuration commands. In some implementations, the layer 2 PCE can service a layer 3 PCE for a path computation and selection; for example, the layer 3 circuit or path establishment requests can be sent by layer 3 PCEs to a layer 2 PCE for computation and path selection. The layer 2 PCE can provide an aggregated summary of layer 2 information to the layer 3 PCE. Accordingly, in many implementations, layer 2 path management and reservation can be independent of the protocol solutions at layer 3. Layer 2 path management can use various protocols, such as Netconf over SSH, 802.1Qca protocol with Explicit Trees (ECT), or any other such protocols.

Accordingly, the layer 3 PCE/PCC of a router 200 can have a dual role, acting either as an L3 FCC client or slave, or as a master or PCE. Layer 3 PCEs can be pre-configured with the layer 3 topology, or can learn the topology dynamically via one or more discovery protocols, such as IS4S, OSPF, HomeNet Control Protocol (HNCP), or any other type and form of protocol. The layer 3 PCE can know both layer 3 and layer 2 QoS and reservations, either with pre-configured data or via reporting from other L3 PCCs with layer 2 summaries. In some implementations, layer 3 circuit or path management and reservation can be independent of the protocol solutions at layer 2. In one implementation, layer 3 path selections can be provided or pushed to other layer 3 routers that control the corresponding layer 2 path, such as via a PCE-initiated label switched path (LSP) model. In some such implementations, path reservation protocols at layer 2 are not necessarily required.

As discussed above, the layer 2 and layer 3 path computation engines can operate independently. The layer 2 PCE can provide layer 2 path computation and reservation as a service for the layer 3 PCE (or for other path computation clients) for layer 3 IP level "circuit" or path reservations. Specifically, in some implementations, layer 3 path computation clients can contact andregister with a layer 3 path computation engine, which then can transmit or push layer 3 path reservations to the PCCs. The PCCs can use layer 2 PCEs as a service to get layer 2 path computations and reservation, which can include QoS enabled routing and load balancing. This can allow for multiprotocol label switching (MPLS)-like performance in a switched or bridged layer 2 network without MPLS support. Additionally, the system can be used with MPLS or point-to-point connection emulation (pseudowires), for transport of layer 2 frames if MPLS and/or pseudowires are supported by layer 3 devices.

IEEE standard(s) from the 802.1 working group, including any draft versions of such standard(s), are hereby incorporated herein by reference in their entirety and are made part of the present disclosure for all purposes. Although this disclosure can reference aspects of these standard(s), the disclosure is in no way limited by these standard(s).

Figure 3A:
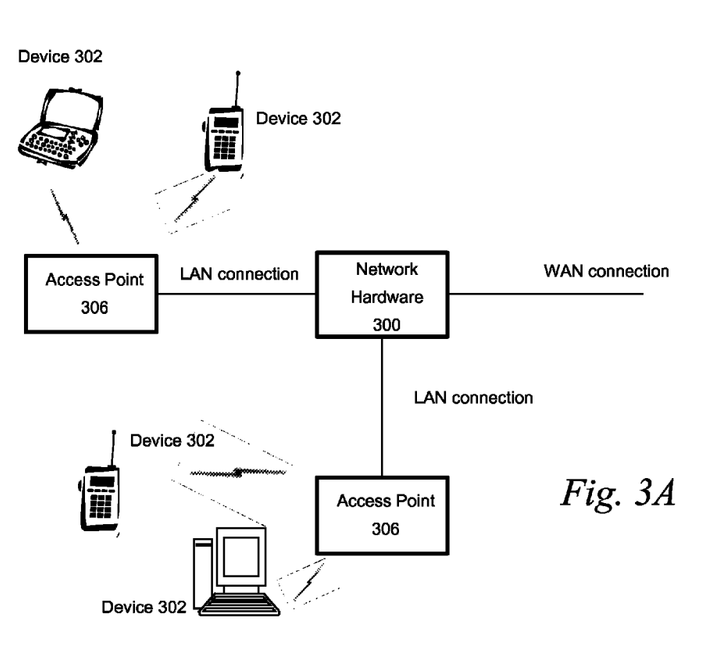
FIG. 3A is a block diagram depicting an embodiment of a network environment including one or more access points in communication with one or more devices or stations.

Having discussed specific embodiments of the present solution, it can be helpful to describe aspects of the operating environment as well as associated system components (e.g., hardware elements) in connection with the methods and systems described herein. Referring to FIG. 3A, an embodiment of a network environment is depicted. In brief overview, the network environment includes a wireless communication system that includes one or more access points 306, one or more wireless communication devices 302 and a network hardware component 392, which can include any of the PCE, PCC, and/or FEs, discussed above. The wireless communication devices 302 can for example include laptop computers 302, tablets 302, personal computers 302 and/or cellular telephone devices 302. The details of an embodiment of each wireless communication device and/or access point are described in greater detail with reference to FIGS. 3B and 3C. The network environment can be an ad hoc network environment, an infrastructure wireless network environment, a subnet environment, etc. in one embodiment The access points (APs) 306 can be operably coupled to the network hardware 392 via local area network connections. The network hardware 392, which can include a router, gateway, switch, bridge, modem, system controller, appliance, etc., can provide a local area network connection for the communication system. Each of the access points 306 can have an associated antenna or an antenna array to communicate with the wireless communication devices 302 in its area. The wireless communication devices 302 can register with a particular access point 306 to receive services from the communication system (e.g., via a SU-MIMO or MU-MIMO configuration). For direct connections (e.g., point-to-point communications), some wireless communication devices 302 can communicate directly via an allocated channel and communications protocol. Some of the wireless communication devices 302 can be mobile or relatively static with respect to the access point 306.

In some embodiments an access point 306 includes a device or module (including a combination of hardware and software) that allows wireless communication devices 302 to connect to a wired network using Wi-Fi, or other standards. An access point 306 can sometimes be referred to as an wireless access point (WAP). An access point 306 can be implemented, designed and/or built for operating in a wireless local area network (WLAN). An access point 306 can connect to a router (e.g., via a wired network) as a standalone device in some embodiments. In other embodiments, an access point can be a component of a router. An access point 306 can provide multiple devices 302 access to a network. An access point 306 can, for example, connect to a wired Ethernet connection and provide wireless connections using radio frequency links for other devices 302 to utilize that wired connection. An access point 306 can be built and/or implemented to support a standard for sending and receiving data using one or more radio frequencies. Those standards, and the frequencies they use can be defined by the IEEE (e.g., IEEE 802.11 standards). An access point can be implemented and/or used to support public Internet hotspots, and/or on an internal network to extend the network's Wi-Fi signal range.

In some embodiments, the access points 306 can be used for (e.g., in-home or in-building) wireless networks (e.g., IEEE 802.11, Bluetooth, ZigBee, any other type of radio frequency based network protocol and/or variations thereof). Each of the wireless communication devices 302 can include a built-in radio and/or is coupled to a radio. Such wireless communication devices 302 and/or access points 306 can operate in accordance with the various aspects of the disclosure as presented herein to enhance performance, reduce costs and/or size, and/or enhance broadband applications. Each wireless communication devices 302 can have the capacity to function as a client node seeking access to resources (e.g., data, and connection to networked nodes such as servers) via one or more access points 306.

The network connections can include any type and/or form of network and can include any of the following: a point-to-point network, a broadcast network, a telecommunications network, a data communication network, a computer network. The topology of the network can be a bus, star, or ring network topology. The network can be of any such network topology as known to those ordinarily skilled in the art capable of supporting the operations described herein. In some embodiments, different types of data can be transmitted via different protocols. In other embodiments, the same types of data can be transmitted via different protocols.

Figure 3B:
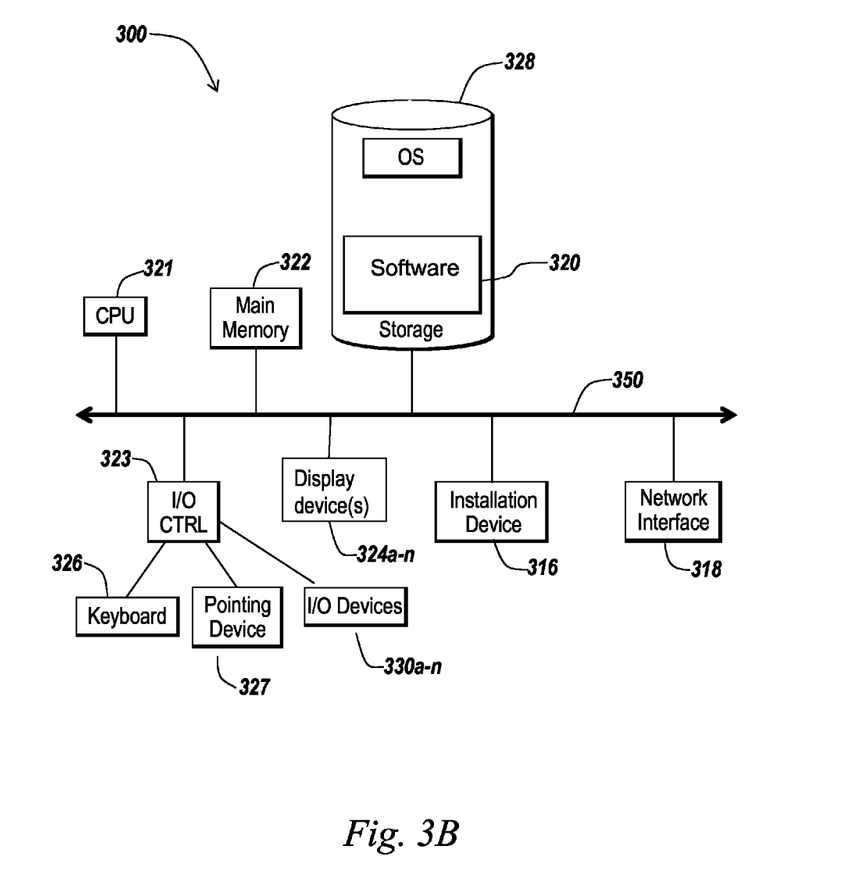
FIGS. 3B and 3C are block diagrams depicting embodiments of computing devices useful in connection with the methods and systems described herein.
Figure 3C:
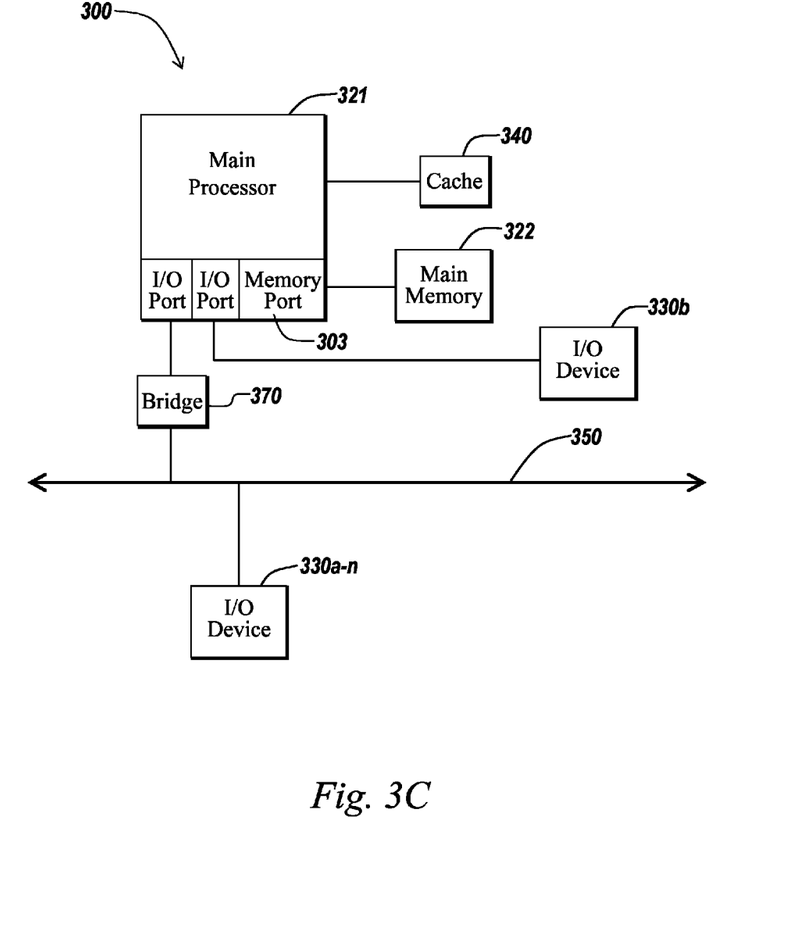

The communications device(s) 302 and access point(s) 306 can be deployed as and/or executed on any type and form of computing device, such as a computer, network device or appliance capable of communicating on any type and form of network and performing the operations described herein. FIGS. 3B and 3C depict block diagrams of a computing device 300 useful for practicing an embodiment of the wireless communication devices 302 or the access point 306. As shown in FIGS. 3B and 3C, each computing device 300 includes a central processing unit 321, and a main memory unit 322. As shown in FIG. 3B, a computing device 300 can include a storage device 328, an installation device 316, a network interface 318, an I/O controller 323, display devices 324a-324n, a keyboard 326 and a pointing device 327, such as a mouse. The storage device 328 can include, without limitation, an operating system and/or software. As shown in FIG. 3C, each computing device 300 can also include additional optional elements, such as a memory port 303, a bridge 370, one or more input/output devices 330a-330n (generally referred to using reference numeral 330), and a cache memory 340 in communication with the central processing unit 321.

The central processing unit 321 is any logic circuitry that responds to and processes instructions fetched from the main memory unit 322. In many embodiments, the central processing unit 321 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 300 can be based on any of these processors, or any other processor capable of operating as described herein.

Main memory unit 322 can be one or more memory chips capable of storing data and allowing any storage location to be directly accessed by the microprocessor 321, such as any type or variant of Static random access memory (SRAM), Dynamic random access memory (DRAM), Ferroelectric RAM (FRAM), NAND Flash, NOR Flash and Solid State Drives (SSD). The main memory 322 can be based on any of the above described memory chips, or any other available memory chips capable of operating as described herein. In the embodiment shown in FIG. 3B, the processor 321 communicates with main memory 322 via a system bus 350

(described in more detail below). FIG. 3C depicts an embodiment of a computing device 300 in which the processor communicates directly with main memory 322 via a memory port 303. For example, in FIG. 3C the main memory 322 can be DRDRAM.

FIG. 3C depicts an embodiment in which the main processor 321 communicates directly with cache memory 340 via a secondary bus, sometimes referred to as a backside bus. In other embodiments, the main processor 321 communicates with cache memory 340 using the system bus 350. Cache memory 340 typically has a faster response time than main memory 322 and is provided by, for example, SRAM, BSRAM, or EDRAM. In the embodiment shown in FIG. 3C, the processor 321 communicates with various I/O devices 330 via a local system bus 350. Various buses can be used to connect the central processing unit 321 to any of the I/O devices 330, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 324, the processor 321 can use an Advanced Graphics Port (AGP) to communicate with the display 324. FIG. 3C depicts an embodiment of a computer 300 in which the main processor 321 can communicate directly with I/O device 330b, for example via HYPERTRANSPORT, RAPIDIO, or INFINIBAND communications technology. FIG. 3C also depicts an embodiment in which local busses and direct communication are mixed: the processor 321 communicates with I/O device 330a using a local interconnect bus while communicating with I/O device 330b directly.

A wide variety of I/O devices 330a-330n can be present in the computing device 300. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices can be controlled by an I/O controller 323 as shown in FIG. 3B. The I/O controller can control one or more I/O devices such as a keyboard 326 and a pointing device 327, e.g., a mouse or optical pen. Furthermore, an I/O device can also provide storage and/or an installation medium 316 for the computing device 300. In still other embodiments, the computing device 300 can provide USB connections (not shown) to receive handheld USB storage devices such as the USB Flash Drive line of devices manufactured by Twintech Industry, Inc. of Los Alamitos, Calif.

Referring again to FIG. 3B, the computing device 300 can support any suitable installation device 316, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 300 can further include a storage device, such as one or more hard disk drives or redundant arrays of independent disks, for storing an operating system and other related software, and for storing application software programs such as any program or software 320 for implementing (e.g., built and/or designed for) the systems and methods described herein. Optionally, any of the installation devices 316 could also be used as the storage device. Additionally, the operating system and the software can be run from a bootable medium.

Furthermore, the computing device 300 can include a network interface 318 to interface to the network 304 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11 ad, CDMA, GSM, WiMax and direct asynchronous connections). In one embodiment, the computing device 300 communicates with other computing devices 300' via any type and/or form of gateway or tunneling protocol such as Secure Socket Layer (SSL) or Transport Layer Security (TLS). The network interface 318 can include a built-in network adapter, network interface card, PCMCIA network card, card bus network adapter, wireless network adapter, USB network adapter, modem or any other device suitable for interfacing the computing device 300 to any type of network capable of communication and performing the operations described herein.

In some embodiments, the computing device 300 can include or be connected to one or more display devices 324a-324n. As such, any of the I/O devices 330a-330n and/or the I/O controller 323 can include any type and/or form of suitable hardware, software, or combination of hardware and software to support, enable or provide for the connection and use of the display device(s) 324a-324n by the computing device 300. For example, the computing device 300 can include any type and/or form of video adapter, video card, driver, and/or library to interface, communicate, connect or otherwise use the display device(s) 324a-324n. In one embodiment, a video adapter can include multiple connectors to interface to the display device(s) 324a-324n. In other embodiments, the computing device 300 can include multiple video adapters, with each video adapter connected to the display device(s) 324a-324n. In some embodiments, any portion of the operating system of the computing device 300 can be implemented for using multiple displays 324a-324n. One ordinarily skilled in the art will recognize and appreciate the various ways and embodiments that a computing device 300 can be implemented to have one or more display devices 324a-324n.

In further embodiments, an I/O device 330 can be a bridge between the system bus 350 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A computing device 300 of the sort depicted in FIGS. 3B and 3C can operate under the control of an operating system, which control scheduling of tasks and access to system resources. The computing device 300 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Wash.; MAC OS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

The computer system 300 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 300 has sufficient processor power and memory capacity to perform the operations described herein.

In some embodiments, the computing device 300 can have different processors, operating systems, and input devices consistent with the device. For example, in one embodiment, the computing device 300 is a smart phone, mobile device, tablet or personal digital assistant. In still other embodiments, the computing device 300 is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device 300 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 4:
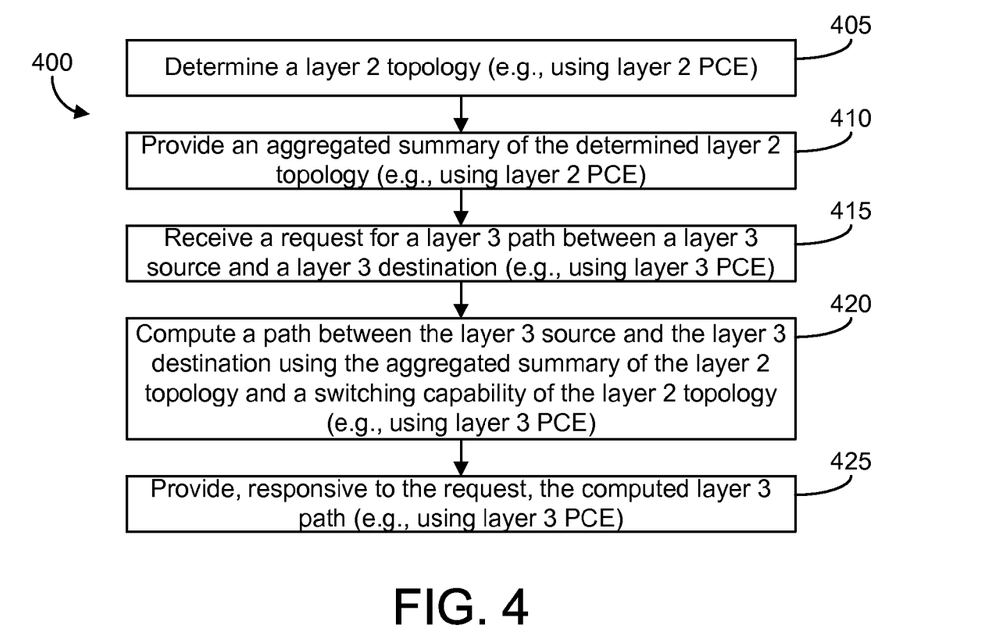
FIG. 4 is a diagram of a flow for providing a computed L3 path, according to an implementation.

Referring now to FIG. 4, a diagram of a flow 400 for providing a computed L3 path is shown according to an illustrative implementation. In the illustrated implementation, a layer 2 topology is determined (e.g., using a layer 2 PCE) (405) and an aggregated summary of the determined layer 2 topology is provided (e.g., by the layer 2 PCE to a layer 3 PCE) (410). A request is received for a layer 3 path between a layer 3 source and a layer 3 destination (e.g., using the layer 3 PCE) (415). A path is computed between the layer 3 source and the layer 3 destination using the aggregated summary of the layer 2 topology and a switching capability of the layer 2 topology (e.g., using the layer 3 PCE) (420). The computer layer 3 path is provided in response to the request (e.g., using the layer 3 PCE) (425).

It should be noted that certain passages of this disclosure can reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture. The article of manufacture can be a floppy disk, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed:

1. A system for managing path selection and reservation, comprising:
a first device comprising circuitry configured to implement:
a layer 2 path computation engine configured to:
determine a layer 2 topology for a plurality of devices in communication with the first device; and
provide, to a layer 3 path computation engine, an aggregated summary of the determined layer 2 topology; and
the layer 3 path computation engine, the layer 3 path computation engine configured to:
receive, from a second device executing a layer 3 path computation client, a request for a layer 3 path between a layer 3 source and a layer 3 destination, wherein the layer 3 source and the layer 3 destination are not within the layer 2 topology;
compute a path between the layer 3 source and the layer 3 destination using the aggregated summary of the layer 2 topology and a switching capability of the layer 2 topology; and
provide, to the layer 3 path computation client of the second device responsive to the request, the computed layer 3 path.

2. The system of claim 1, wherein the layer 2 path computation engine is configured to determine the layer 2 topology for the plurality of devices in communication with the first device using configuration data provided to the layer 2 path computation engine.

3. The system of claim 1, wherein the layer 2 path computation engine is configured to determine the layer 2 topology for the plurality of devices in communication with the first device by dynamically learning the layer 2 topology using a routing discovery protocol.

4. The system of claim 1, wherein the layer 2 path computation engine is configured to receive a request from the layer 3 path computation engine and provide the aggregated summary of the determined layer 2 topology in response to the request.

5. The system of claim 1, wherein the layer 2 path computation engine is configured to perform at least one of quality of service balancing or reservations for the layer 2 topology.

6. The system of claim 1, wherein the layer 3 path computation engine is configured to determine a layer 2 path to a next layer 3 link using the aggregated summary of the layer 2 topology.

7. The system of claim 1, wherein the layer 3 path computation engine is implemented within a router device, and wherein the layer 2 path computation engine is implemented within a bridge device in communication with the router device.

8. A method for managing path selection and reservation, comprising:
- determining a layer 2 topology for a plurality of devices in communication with a first device;
- providing an aggregated summary of the determined layer 2 topology;
- receiving, from a second device, a request for a layer 3 path between a layer 3 source and a layer 3 destination;
- computing a path between the layer 3 source and the layer 3 destination using the aggregated summary of the layer 2 topology and a switching capability of the layer 2 topology, wherein the layer 3 source and the layer 3 destination are not within the layer 2 topology; and
- providing, to the second device responsive to the request, the computed layer 3 path.

9. The method of claim 8, wherein determining the layer 2 topology comprises determining, by a layer 2 path computation engine, the layer 2 topology using configuration data provided to the layer 2 path computation engine.

10. The method of claim 8, wherein determining the layer 2 topology comprises dynamically learning, by a layer 2 path computation engine, the layer 2 topology using a routing discovery protocol.

11. The method of claim 8, further comprising receiving a request, the aggregated summary of the determined layer 2 topology provided in response to the request.

12. The method of claim 8, wherein the layer 2 topology is determined and the aggregated summary is provided by a layer 2 path computation engine, and wherein the layer 2 path computation engine is configured to perform at least one of quality of service balancing or reservations for the layer 2 topology.

13. The method of claim 8, wherein computing the path between the layer 3 source and the layer 3 destination comprises determining, by a layer 3 path computation engine, a layer 2 path to a next layer 3 link using the aggregated summary of the layer 2 topology.

14. One or more non-transitory computer-readable storage media having instructions stored thereon that, when executed by one or more processors, cause the one or more processors to implement operations comprising:
- determining a layer 2 topology for a plurality of devices in communication with a first device;
- providing an aggregated summary of the determined layer 2 topology;
- receiving, from a second device, a request for a layer 3 path between a layer 3 source and a layer 3 destination, wherein the layer 3 source and the layer 3 destination are not within the layer 2 topology;
- computing a path between the layer 3 source and the layer 3 destination using the aggregated summary of the layer 2 topology and a switching capability of the layer 2 topology; and
- providing, to the second device responsive to the request, the computed layer 3 path.

15. The one or more non-transitory computer-readable storage media of claim 14, wherein determining the layer 2 topology comprises determining, by a layer 2 path computation engine, the layer 2 topology using configuration data provided to the layer 2 path computation engine.

16. The one or more non-transitory computer-readable storage media of claim 14, wherein determining the layer 2 topology comprises dynamically learning, by a layer 2 path computation engine, the layer 2 topology using a routing discovery protocol.

17. The one or more non-transitory computer-readable storage media of claim 14, wherein the operations further comprise receiving a request, the aggregated summary of the determined layer 2 topology provided in response to the request.

18. The one or more non-transitory computer-readable storage media of claim 14, wherein the layer 2 topology is determined and the aggregated summary is provided by a layer 2 path computation engine, and wherein the layer 2 path computation engine is configured to perform at least one of quality of service balancing or reservations for the layer 2 topology.

19. The one or more non-transitory computer-readable storage media of claim 14, wherein computing the path between the layer 3 source and the layer 3 destination comprises determining, by a layer 3 path computation engine, a layer 2 path to a next layer 3 link using the aggregated summary of the layer 2 topology.

20. The one or more non-transitory computer-readable storage media of claim 19, wherein the aggregated summary is provided by a layer 2 path computation engine, wherein the layer 3 path computation engine is implemented within a router device, and wherein the layer 2 path computation engine is implemented within a bridge device in communication with the router device.

\* \* \* \* \*